United States Patent [19]

Ikejiri et al.

[11] Patent Number: 5,405,904
[45] Date of Patent: Apr. 11, 1995

[54] CONNECTORS

[75] Inventors: Fumitoshi Ikejiri; Katunari Nishimura, both of Yamaguchi; Takao Nozaki, Yokkaichi; Akira Nabeshima, Yokkaichi; Masamitsu Chishima, Yokkaichi, all of Japan

[73] Assignees: Mitsui Petrochemical Industries, Ltd.; Sumitomo Wiring Systems, Ltd., both of Japan

[21] Appl. No.: 244,627

[22] PCT Filed: Oct. 5, 1993

[86] PCT No.: PCT/JP93/01429
§ 371 Date: Jun. 3, 1994
§ 102(e) Date: Jun. 3, 1994

[87] PCT Pub. No.: WO94/08363
PCT Pub. Date: Apr. 14, 1994

[30] Foreign Application Priority Data

Oct. 5, 1992 [JP] Japan .................................. 4-266286

[51] Int. Cl.$^6$ .............................................. C08G 18/60
[52] U.S. Cl. ...................................... 524/394; 524/398; 524/399; 524/400; 525/66
[58] Field of Search ............... 524/487, 394, 398, 399, 524/400, 504; 525/66

[56] References Cited

U.S. PATENT DOCUMENTS 5,202,379  4/1993  Aoki et al. ............................ 525/66
5,336,540  8/1994  Kato et al. ............................ 525/66

FOREIGN PATENT DOCUMENTS 1-311580  12/1989  Japan .
3-163165   7/1991  Japan .
3-201375   9/1991  Japan .
3-285951  12/1991  Japan .

*Primary Examiner*—Morton Foelak
*Attorney, Agent, or Firm*—Sherman and Shalloway

[57] ABSTRACT

The connector of the present invention has a housing formed from a polyamide resin composition which comprises 65–85% by weight of a specific polyamide (A), and 5–20% by weight of a graft-modified α-olefin random copolymer and/or graft-modified vinyl aromatic hydrocarbon/conjugated diene copolymer or a hydrogenation product thereof (B), and 0.1–1.0% by weight, based on 100% by weight of the total of the aromatic polyamide (A) and graft-modified copolymer (B), of a polyethylene wax or a metallic salt of an aliphatic carboxylic acid having 26–32 carbon atoms (C), and further, optionally, an antioxidant (D).

An object of the present invention is to provide a connector which is free from a decrease in characteristics such as toughness by heating, and, in particular, can be formed with excellent moldability, and is light weight.

7 Claims, 3 Drawing Sheets

CONNECTORS

FIELD OF THE INVENTION

This invention relates to connectors, in particular those which do not deteriorate their characteristics, such as toughness, by heating, can be prepared with excellent molding workability, and are especially suitable for use in automobiles.

TECHNICAL BACKGROUND

As plastic materials for automotive connectors, there have been used, for example aliphatic polyamides (PA 66, PA 6) and polybutylene terephthalate (PBT).

However, aliphatic polyamides tend to absorb water to decrease modulus of elasticity, so that there have been a problem that when a connector made of an aliphatic polyamide is used in water or under conditions of high humidity, the connector may loose its firm fitting and even may be taken out. On the other hand, connectors made of PBT are heavy due to its high specific gravity. There is also a problem that heat resistance of PBT is not always sufficient.

Water absorption characteristics of aliphatic polyamides can be improved by combining it with an aromatic polyamide (see Japanese Patent Application No. 2-85,208).

However, such combination of aliphatic and aromatic polyamides may lead to poor moldability. Such poor moldability can be improved by elevating a molding temperature, but this gives rise to a new problem that where a connector of a certain shape is to be molded, it may sometimes stick in the mold.

In order to solve such problem of poor mold release associated with the use of an aromatic polyamide, an attempt to improve the mold releasability by the addition of a mold release agent to the aromatic polyamide has been proposed, for example, in JP-A-3-163,165. The mold release agent used therein includes metallic salts of higher fatty acids, for example calcium stearate and derivatives of aliphatic carboxylic acids such as aliphatic alcohol esters of montanic acid, which can also usable as form release agents for aliphatic polyamides.

It has been found, however, that when a mold release agent, for example disclosed in the above-mentioned JP-A, is added to a composition comprising an aromatic polyamide, the mold release agent may evolve gas and foam during a molding step to lead deterioration of properties of connectors obtained. This is because an aromatic polyamide has a higher melting point than an aliphatic polyamide so that a composition comprising an aromatic polyamide must be molded at a temperature higher than that of a composition comprising an aliphatic polyamide. That is, even if it is intended to prepare connectors from the aromatic polyamide composition containing the compound used as the mold release agent for aliphatic polyamide as mentioned above, such compound may decompose at the molding temperature to foam and cannot effectively function as the mold release agent, resulting in poor mold releasing of the connectors. Further, because of such poor moldability, there may be obtained connectors which sometimes do not have intendedly improved characteristics such as toughness.

An object of the present invention is to provide lightweight connectors which do not deteriorate their characteristics, such as toughness, by heating, and can be prepared with excellent molding workability.

DISCLOSURE OF THE INVENTION

The connector of the present invention has a housing which is formed from a polyamide resin composition comprising (A) 65–90% by weight of an aromatic polyamide having an intrinsic viscosity ($\eta$), as measured in a concentrated sulfuric acid at 30° C., of 0.5–3.0 dl/g and a melting point of exceeding 300° C., said aromatic polyamide (A) being composed of
recurring units comprising 50–100 mol % of terephthalic acid constituent units, 0–50% by mol of aromatic dicarboxylic acid constituent units other than the terephthalic acid units and/or 0–50% by mol of aliphatic dicarboxylic acid constituent units, each of which has 4 to 20 carbon atoms, and
recurring units comprising aliphatic alkylenediamine constituent units and/or alicyclic alkylenediamine constituent units; and (B) 10–35% by weight of a graft-modified α-olefin random copolymer and/or a graft-modified vinyl aromatic hydrocarbon/conjugated diene copolymer or a hydrogenation product thereof, with the proviso that the sum total of aromatic polyamide (A) and graft-modified copolymer (B) is 100% by weight; and (C) 0.1–1.0% by weight, based on 100% by weight of the sum total of aromatic polyamide (A) and graft-modified copolymer (B), of at least one compound selected from the group consisting of polyethylene waxes and metallic salts of aliphatic carboxylic acids having 26–32 carbon atoms.

The polyamide resin composition according to the invention may further contain an antioxidant (D) along with the components (A), (B) and (C), and in this case it is desirable that the antioxidant (D) comprises a hindered phenol antioxidant preferably having a molecular weight of at least 500 and a sulfur antioxidant preferably having a molecular weight at least 600.

In the aromatic polyamide (A) according to the invention, it is preferable that the dicarboxylic acid constituent units comprise 50–80% by mol of terephthalic acid constituent units, 0–40% by mol of aromatic dicarboxylic acid component unit other than the terephthalic acid units, and 20–50% by mol of aliphatic dicarboxylic acid constituent units.

The graft-modified α-olefin random copolymer and/or graft-modified vinyl aromatic hydrocarbon/conjugated diene copolymer or hydrogenated product thereof (B) is preferably a graft-modified ethylene/propylene copolymer.

The metallic salt of aliphatic carboxylic acid having 26–32 carbon atoms is preferably sodium montanate.

The present invention has been accomplished on the basis of the finding that by incorporating a specific compound as a mold release agent (C) into a specific aromatic polyamide (A) and a graft-modified elastomeric copolymer (B), a very good moldability of the composition can be ensured.

The connector of the present invention has a housing formed from a composition comprising an aromatic polyamide, a graft-modified elastomeric copolymer and a specific compound acting as a mold release agent in specific proportions. That is, the composition used according to the invention provides a connector with excellent molding workability, and the connector is lightweight due to its low specific gravity and has very high heat resistance.

Figure 1:
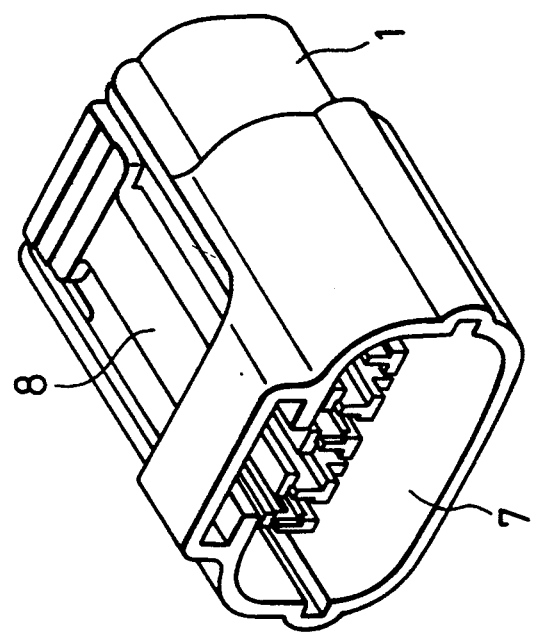
FIG. 1 is a perspective view showing an example of housings for a connector of the present invention.
Figure 1:
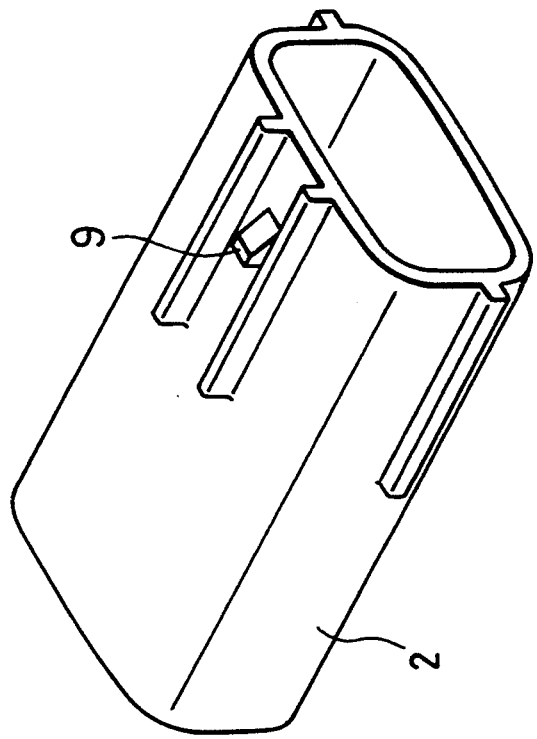

Meanings of reference numbers:
1 ... Female housing
2 ... Male housing
3a ... Terminal inserting chamber
3b ... Terminal inserting chamber
4 ... Female terminal
5a ... Hooking member (lance)
6 ... Male terminal
11 ... Sprue runner
12 ... Molded article (cup-like article)
13 ... Pushing pin
14 ... Pressure sensor
15 ... Mold release force recorder
16 ... Male mold
17 ... Female mold

BEST MODE FOR CARRYING OUT THE INVENTION

The connectors of the present invention are illustrated in more detail hereinafter.

The connectors of the present invention are formed from a resin composition comprising a specific aromatic polyamide (A), a specific graft-modified elastomeric copolymer (B), and a mold release agent (C), and, optionally, an antioxidant (D), the description of these components will follow.

Aromatic Polyamide (A)

The aromatic polyamide (A) is composed of recurring units derived from specific dicarboxylic acid constituent units (a), and specific aliphatic diamine constituent units or alicyclic diamine constituent units (b).

The specific dicarboxylic acid constituent units (a) comprise terephthalic acid constituent units (a-1) as essential constituent units. The recurring units of the terephthalic acid constituent units (a-1) may be represented by the following formula [I-a]:

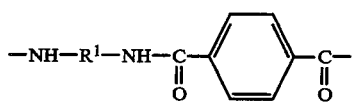

[I-a]

wherein $R^1$ is a divalent hydrocarbon group, preferably an alkylene group having 4–18 carbon atoms.

All of the specific dicarboxylic acid constituent units (a) need not necessarily be composed of the constituent units represented by the above formula [I-a], and a part of the terephthalic acid constituent units (a-1) may be replaced by other dicarboxylic acid constituent units.

Such dicarboxylic acid constituent units other than the terephthalic acid constituent units include aromatic dicarboxylic acid constituent units (a-2) and aliphatic dicarboxylic acid constituent units (a-3).

Examples of the aromatic dicarboxylic acid constituent units (a-2) include constituent units derived from isophthalic acid, 2-methyl terephthalic acid and naphthalene dicarboxylic acid, and isophthalic acid constituent units are especially preferred.

Of the aromatic dicarboxylic acid constituent units (a-2) other than terephthalic acid, the isophthalic acid constituent units particularly preferred in the invention may be represented by the following formula [I-b]:

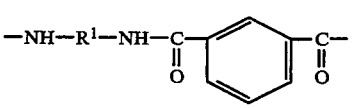

[I-b]

wherein $R^1$ is a divalent hydrocarbon group, preferably an alkylene group having 4–18 carbon atoms.

The aliphatic dicarboxylic acid constituent units (a-3) are derived usually from aliphatic dicarboxylic acids having 4–20 carbon atoms, preferably 6–12 carbon atoms in an alkylene group. Examples of the aliphatic dicarboxylic acids used for deriving such aliphatic dicarboxylic acid constituent units (a-3) include succinic acid, adipic acid, azelaic acid and sebacic acid.

Where the polyamide comprises the aliphatic dicarboxylic acid constituent units, it is particularly preferable that these units are derived from adipic acid and sebacic acid.

The recurring units of the aliphatic dicarboxylic acid constituent units (a-3) constituting the dicarboxylic acid constituent units (a) may be represented by the following formula [II]:

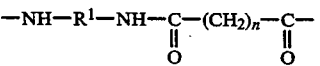

[II]

wherein $R^1$ has the same meaning as defined above, and n is an integer of usually 2–18, preferably 4–10.

The recurring units constituting the polyamide used in the present invention comprise the dicarboxylic acid constituent units (a) and the diamine constituent units (b) as mentioned above.

The diamine constituent units (b) may be derived from aliphatic alkylene diamines and/or alicyclic diamines having 4–18 carbon atoms.

Specific examples of the aliphatic alkylene diamines include 1,4-diaminobutane, 1,6-diaminohexane, trimethyl-1,6-diaminohexane, 1,7-diaminoheptane, 1,8-diaminooctane, 1,9-diaminononane, 1,10-diaminodecane, 1,11-diaminoundecane and 1,12-diaminododecane. A specific example of the alicyclic diamines include diaminocyclohexane.

Preferred diamine constituent units used in the present invention are those derived from straight chain aliphatic alkylene diamines, particularly 1,6-diaminohexane, 1,8-diaminooctane, 1 10-diaminodecane, 1,12-diaminododecane and mixtures thereof. Of these constituent units, especially preferred are those derived from 1,6-diaminohexane.

In the aromatic polyamide (A) used in the present invention, the content of the terephthalic acid constituent units (a-1) is 50–100% by mol, preferably 50–80% by mol, more preferably 50–70% by mol; the content of the aromatic dicarboxylic acid constituent units other than terephthalic acid (a-2) is 0–50% by mol, preferably 0–40% by mol, more preferably 0–20% by mol; and the content of the aliphatic dicarboxylic acid constituent units (a-3) is 0–50% by mol, preferably 10–50% by mol, more preferably 20–50% by mol, particularly 30–50% by mol, with the proviso that the total dicarboxylic acid constituent units is 100% by mol.

The polyamide used according to the present invention may contain small amounts of constituent units derived from polyvalent carboxylic acids having at least tribasicity such as trimellitic acid or pyromellitic acid, in addition to the above-mentioned essential constituent units, i.e. the terephthalic acid constituent units, and optionally the constituent units derived from aromatic dicarboxylic acids other than terephthalic acid, representative of which is isophthalic acid, and optionally the aliphatic dicarboxylic acid constituent units. Such constituent units derived from polyvalent carboxylic acid are usually contained in the aromatic polyamide (A) in an amount of 0–5% by mol.

The aromatic polyamide (A) may be a mixture comprising an aromatic polyamide composed mainly of the recurring units of the above formula [I-a] and an aromatic polyamide composed mainly of the recurring units of the above formula [I-b]. In this case, the content of the aromatic polyamide composed mainly of the recurring units of the formula [I-a] is usually not less than 50% by weight, preferably not less than 55% by weight.

The aromatic polyamide (A) used in the present invention has an intrinsic viscosity ($\eta$), as measured in a concentrated sulfuric acid at 30° C., is usually 0.5–3.0 dl/g, preferably 0.5–2.8 dl/g and especially 0.6–2.5 dl/g. The content of amino groups in the aromatic polyamide, as measured by neutralization titration in a meta-cresol solution with p-toluenesulfonic acid, is usually 0.04–0.2 milli equivalent/g, preferably 0.045–0.15 milli equivalent/g and especially 0.5–0.1 milli equivalent/g.

Because of its composition as mentioned above, the aromatic polyamide (A) has a melting point higher than that of an aliphatic polyamide conventionally used hitherto. That is, the aromatic polyamide (A) used in the invention has a melting point exceeding 300° C. and the aromatic polyamide (A) having a melting point of preferably 305°–340° C. more preferably 310°–330° C. exhibits excellent heat resistance. Further, the glass transition temperature of an amorphous portion of the aromatic polyamide (A) is usually at least 80° C.

Because of its specific structure, the aromatic polyamide according to the invention exhibits a low water absorption value, whereas conventional aliphatic polyamides have been accompanied by a problem of high water absorption values.

Although the aromatic polyamide as mentioned above has a low value of water absorption and favorable heat resistance, it has been found that this aromatic polyamide tends to have low toughness as compared with aliphatic polyamides, and this may cause another problem that molded articles formed therefrom are insufficient in elongation or brittle. Because a high level of reliability is required in particular for automotive parts, it is an important subject that a further improvement in toughness of the aromatic polyamide is attained.

Graft-Modified Copolymer (B)

The resin composition from which the connectors of the present invention are formed contains a graft-modified elastomeric α-olefin random copolymer and/or a graft-modified vinyl aromatic hydrocarbon/conjugated diene copolymer or a hydrogenation product thereof (B).

The graft-modified α-olefin random elastomeric copolymer used in the present invention is a graft-modified product of a copolymer in which two types of recurring units derived from different α-olefins are arranged at random.

The graft-modified α-olefin random elastomeric copolymer has a low crystallinity or is amorphous, and it is preferable that this copolymer is substantially amorphous. That is, this copolymer has a crystallinity, as measured by X-ray diffractometry, of not more than 10%, preferably not more than 5%, particularly 0%. Accordingly, many of the graft-modified α-olefin random elastomeric copolymers do not exhibit any distinct melting point. Further, because of their low crystallinity, the graft-modified α-olefin random elastomeric copolymers are soft and have a tensile modulus of usually at least 0.1 kg/cm$^2$ and lower than 20000 kg/cm$^2$, preferably from 1 kg/cm$^2$ to 15000 kg/cm$^2$.

The graft-modified α-olefin random copolymer has a melt index (as measured at 190° C.) of usually 0.1–30 g/10 min, preferably 1.0–20 g/10 min, especially 2.0–15 g/10 min, and a value of Mw/Mn, as measured by GPC, of usually not more than 5.5, preferably not more than 4.5, especially not more than 3.5.

Further, this graft-modified α-olefin random elastomeric copolymer has a glass transition temperature (Tg) of usually −150° to +50° C., preferably −80° to −20° C., and an intrinsic viscosity ($\eta$), as measured in decalin at 135° C., of usually 0.2–10 dl/g, preferably 1–5 dl/g, and a density of usually 0.82–0.96 g/cm$^3$, preferably 0.84–0.92 g/cm$^3$.

Specific examples of the graft-modified α-olefin random elastomeric copolymers having the above-mentioned characteristics include a graft-modified ethylene/α-olefin copolymer rubber (i) comprising ethylene as a major monomer and a graft-modified propylene/α-olefin copolymer rubber (ii) comprising propylene as a major monomer.

By way of typical examples of the graft-modified α-olefin random elastomeric copolymers as mentioned above, the graft-modified ethylene/α-olefin copolymer rubber (i) and the graft-modified propylene/α-olefin copolymer rubber (ii) are illustrated below in more detail.

For the graft-modified ethylene/α-olefin copolymer rubber (i), α-olefins having usually 3–20 carbon atoms are used. Examples of these α-olefins include propylene, butene-1, pentene-1, hexene-1 ,4-methylpentene-1, octene-1, decene-1 and mixtures thereof. Of those, propylene and/or butene-1are particularly preferred.

For the graft-modified propylene/α-olefin copolymer rubber (ii), α-olefins having usually 4–20 carbon atoms are used. Examples of these α-olefins include butene-1, pentene-1, hexene-1 , 4-methylpentene-1, octene-1, decene-1 and mixtures thereof. Of those, butene-1 is particularly preferred.

In the graft-modified ethylene/α-olefin copolymer rubber (i) as mentioned above, the molar ratio (ethylene/α-olefins of ethylene to α-olefin is generally 10/90 to 99/1, preferably 50/50 to 95/5, though it varies depending on the types of α-olefins used. When the α-olefin used is propylene, the molar ratio is preferably 50/50 to 90/10, especially 70/30 to 85/15. When the α-olefin used is one having at least 4 carbon atoms, the molar ratio is preferably 80/20 to 95/5.

Examples of ethylene/α-olefin copolymers for the graft-modified ethylene/α-olefin copolymer rubbers (i) as mentioned above include binary component copolymers such as an ethylene/propylene copolymer, an ethylene/butene-1copolymer, an ethylene/4-methylpentene-1 copolymer, an ethylene/hexene-1 copolymer, an ethylene/octene-1 copolymer and an ethylene/decene-1 copolymer; and multicomponent copolymers such as an ethylene/propylene/1,4-hexadiene copolymer, an ethylene/propylene/dicyclopentadiene copolymer, an ethylene/propylene/5-ethylidene-2-norbornene copolymer, an ethylene/propylene/2,5-norbornadiene copolymer, an ethylene/butene-1/dicyclopentadiene copolymer, an ethylene/butene-1/1,4-hexadiene copolymer and an ethylene/butene-1/5-ethylidene-2-norbornene copolymer.

In the graft-modified propylene/α-olefin copolymer rubber (ii), the molar ratio (propylene/α-olefin) of propylene to α-olefin is preferably 50/50 to 95/5, though it varies depending on the types of α-olefins used. When α-olefin used is 1-butene, the molar ratio is preferably 50/50 to 90/10, and when α-olefin used is one having at least 5 carbon atoms, the molar ratio is preferably 80/20 to 95/5.

The α-olefin random elastomeric copolymer may contain, in addition to those derived from α-olefins, further constituent units such as those derived from diene compounds as in the above-mentioned multicomponent copolymers, if characteristics of the α-olefin random elastomeric copolymer are not deteriorated.

These constituent units which may be contained in the α-olefin random copolymer include, for example, those derived from chain non-conjugated dienes such as 1,4-hexadiene, 1,6-octadiene, 2-methyl-1,5-hexadiene, 6-methyl-1,5-heptadiene and 7-methyl-1,6-octadiene;

constituent units derived from cyclic non-conjugated dienes such as cyclohexadiene, dicyclopentadiene, methyl tetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene;

constituent units derived from further diene compounds such as 2,3-diisopropylidene-5-norbornene, 2-ethylidene-3-isopropylidene-5-norbornene and 2-propenyl-2,2-norbornadiene; and further constituent units derived from cycloolefins.

The content of the above-mentioned diene constituent units in the α-olefin random elastomeric copolymer is usually not more than 10% by mol, preferably not more than 5% by mol.

The graft-modified α-olefin random elastomeric copolymer used in the present invention may be prepared by graft-modifying the unmodified α-olefin random elastomeric copolymers as mentioned above with unsaturated carboxylic acids, anhydrides thereof or derivatives thereof.

Examples of unsaturated carboxylic acids used herein include acrylic acid, methacrylic acid, α-ethylacrylic acid, maleic acid, fumaric acid, itaconic acid, citraconic acid, tetrahydrophthalic acid, methyltetrahydrophthalic acid, endocis-bicyclo[2.2.1]hept-5-en-2,5-dicarboxylic acid (Nadic Acid ™) and methyl-endocis-bicyclo[2.2.1]hept-5-en-2,5-dicarboxylic acid (Methylnadic Acid ™). Preferred examples of unsaturated carboxylic acid anhydrides include maleic anhydride, citraconic anhydride, Nadic Acid anhydride and Methylnadic Acid anhydride. Usable as the unsaturated carboxylic acid derivatives are acid halide compounds (e.g. maleyl chloride), imide compounds (e.g. maleimide) and ester compounds (e.g. monomethyl maleate, dimethyl maleate and glicidyl maleate).

These graft modifiers may be used either singly or in combination.

Of the above-mentioned graft modifiers, it is preferable to use the unsaturated carboxylic acid anhydrides, especially maleic anhydride or Nadic Acid anhydride.

The graft-modification of the above-mentioned α-olefin random copolymer may be conducted, for example, by a method where the ungraft-modified copolymer is suspended or dissolved in a solvent, and the graft modifier is added to the suspension or solution to carry out the graft-modifying reaction (solution method), and by a method where the graft-modifying reaction is carried out while melting a mixture of the ungraft-modified copolymer and the graft modifier (melting method).

The above-mentioned graft-modified α-olefin random copolymer and the graft-modified vinyl aromatic hydrocarbon/conjugated diene copolymer or hydrogenation product thereof (B), the latter two components of which will be illustrated later, may be a graft modification product which may be prepared by mixing a corresponding unmodified polymer and a graft modifier in amounts such that a desired graft ratio is obtained, or by diluting a corresponding graft-modified product having a high graft ratio previously prepared with a corresponding unmodified polymer to obtain a desired graft ratio.

The amount of graft modifier used in the graft reaction may be decided taking the reactivity of the modifier into consideration, and is generally in the range of 1–10 parts by weight based on 100 parts by weight of the unmodified α-olefin random elastomeric copolymer.

By the graft reaction in this manner, there may be obtained a graft-modified α-olefin random elastomeric copolymer in which the graft modifier has been graft polymerized on the unmodified α-olefin random elastomeric copolymer in an amount of usually 0.0–10 parts by weight, preferably 0.05–5 parts by weight, especially 0.1–3 parts by weight, per 100 parts by weight of the unreacted elastomeric copolymer.

In carrying out the graft reaction, the graft efficiency can be improved by the use of a radical initiator. There can be used known radical initiators such as organic peroxides, organic peresters and azo compounds. The amount of the radical initiator is usually 0.01–20 parts by weight, based on 100 parts by weight of the unmodified α-olefin random elastomeric copolymer.

Of the graft-modified α-olefin random elastomeric copolymers as illustrated above, the use of a graft-modified ethylene/propylene random copolymer rubber or graft-modified ethylene/α-olefin random copolymer rubber which has an ethylene content of 35–50% by mol and is substantially amorphous can provide effective reduction in loss of toughness of the connector by heat deterioration.

The graft-modified vinyl aromatic hydrocarbon/conjugated diene copolymer (B) used in the composition of the invention is a graft modified product of a random or block copolymer of a vinyl aromatic hydrocarbon and a conjugated diene compound, and a hydrogenation product of the graft modified copolymer may also be used.

Specific examples of the vinyl aromatic hydrocarbon/conjugated diene copolymers or hydrogenation products thereof used for preparing the above-mentioned graft-modified product include styrene/butadiene block copolymer rubbers, styrene/butadiene/styrene block copolymer rubbers, styrene/isoprene block copolymer rubbers, styrene/isoprene/styrene block copolymer rubbers, hydrogenated styrene/butadiene/styrene block copolymer rubbers, hydrogenated styrene/isoprene/styrene block copolymer rubbers and styrene/butadiene random copolymer rubbers. In the hydrogenated copolymer rubbers as referred to above, the double bonds remaining in the copolymer rubbers have been partly or fully hydrogenated.

In these copolymers, the molar ratio (vinyl aromatic hydrocarbon/conjugated diene) of the recurring units derived from the vinyl aromatic hydrocarbon to the recurring units derived from the conjugated diene is usually 10/90 to 70/30, preferably 20/80 to 50/50.

The vinyl aromatic hydrocarbon/conjugated diene copolymer or hydrogenation product thereof has an intrinsic viscosity ($\eta$), as measured in decalin at 135° C., of usually 0.01–10 dl/g, preferably 0.08–7 dl/g; a glass transition temperature (Tg) of usually not more than 0° C. preferably not more than −10° C., especially not more than −20° C.; and a crystallinity, as measured by X-ray diffractometry, of 0–10%, preferably 0–7%, especially 0–5%.

The graft-modified vinyl aromatic hydrocarbon/conjugated diene copolymer used in the invention may be prepared in the same manner as in the preparation of the above-mentioned graft-modified $\alpha$-olefin random elastomeric copolymer by graft-modifying the unmodified vinyl aromatic hydrocarbon/conjugated diene copolymer with unsaturated carboxylic acids, anhydrides thereof or derivatives thereof.

Examples of the unsaturated carboxylic acids, anhydrides thereof and derivatives thereof used herein include those compounds used in preparing the above-mentioned graft-modified $\alpha$-olefin random elastomeric copolymer. These compounds may also be used either singly or in combination.

Of these graft modifiers, preferred are unsaturated carboxylic acid anhydrides and especially maleic anhydride or Nadic Acid anhydride.

The graft polymerization of such graft modifier on the above-mentioned unmodified copolymer or hydrogenation product thereof may be carried out by a solution method and a melting method as described in the modification of $\alpha$-olefin random elastomeric copolymer.

In the graft reaction, the amount of the graft modifier used is decided taking the reactivity of the modifier into consideration, and the graft modifier is generally used in an amount of 1–10 parts by weight preferably 1–5 parts by weight, based on 100 parts by weight of the unmodified vinyl aromatic hydrocarbon/conjugated diene copolymer or hydrogenation product thereof. In the graft reaction, there may also be used radical initiators such as organic peroxides, organic peresters and azo compounds in a similar manner as mentioned above.

By carrying out the graft reaction in the manner as mentioned above, there can be obtained a graft-modified vinyl aromatic hydrocarbon/conjugated diene copolymer or hydrogenation product thereof, in which the graft modifier has been graft polymerized in an amount of usually 0.01–10 parts by weight, preferably 0.05–5 parts by weight, based on 100 parts by weight of the unmodified aromatic vinyl hydrocarbon/conjugated diene copolymer or hydrogenation product thereof.

The graft-modified vinyl aromatic hydrocarbon/conjugated diene copolymer or hydrogenation product thereof thus obtained is a low crystalline or amorphous copolymer, and a substantially amorphous copolymer is preferred. That is, of these graft-modified copolymers, those having a crystallinity, as measured by X-ray diffractometry, of not more than 10%, preferably not more than 7%, especially not more than 5% are used, and those having a crystallinity of substantially 0% are particularly preferred. Accordingly, many of the graft-modified vinyl aromatic hydrocarbon-nonconjugated diene copolymers or hydrogenation products thereof do not exhibit a distinct melting point. Further, because of their low crystallinity, these graft-modified aromatic hydrocarbon/conjugated diene copolymers or hydrogenation products thereof are soft, and have a tensile modulus of usually at least 0.1 /cm² and less than 20000 kg/cm², preferably 1 kg/cm² to 15000 kg/cm².

The graft-modified vinyl aromatic hydrocarbon/conjugated diene copolymer or hydrogenation product thereof has a melt index (as measured at 190° C.) of usually 0.1–30 g/10 min, preferably 1.0–20 g/10 min, especially 2.0–15 g/10 min.

The graft-modified vinyl aromatic hydrocarbon/conjugated diene copolymer or hydrogenation product thereof has a glass transition temperature (Tg) of usually −150° to +50° C., preferably −80° to −20° C.; and an intrinsic viscosity ($\eta$), as measured in decalin at 135° C., of usually 0.0–10 dl/g, preferably 1–5 dl/g.

By the use of such graft-modified vinyl aromatic hydrocarbon/conjugated diene copolymer or hydrogenation product thereof, there can be attained effective reduction in loss of toughness of the connector by heat deterioration. When the connector is intended to be used at high temperatures and for a long period of time, the use of the hydrogenation product is particularly preferred.

Among the above-mentioned graft-modified $\alpha$-olefin random copolymers and the graft-modified vinyl aromatic hydrocarbon/conjugated diene copolymers or hydrogenation products thereof (B), it is particularly preferable to use in the present invention a graft-modified ethylene/propylene copolymer, and a graft modified and hydrogenated product of a styrene/butadiene/styrene block copolymer.

In the present invention, the graft-modified $\alpha$-olefin random copolymer, the graft-modified vinyl aromatic hydrocarbon/conjugated diene copolymer or hydrogenation product thereof (B) may be used either singly or in combination. It is particularly preferable to use a mixture of both components in about equal amounts from the standpoint of an excellent balance among various physical properties.

Into the above-mentioned graft-modified $\alpha$-olefin random copolymer and/or the graft-modified vinyl aromatic hydrocarbon/conjugated diene copolymer or hydrogenation product thereof (B), other polymers or copolymers may be incorporated to an extent such that characteristics of these resins are not deteriorated.

Mold Release Agent (C)

The resin composition used in the present invention contains the aromatic polyamide (A) and the graft-modified copolymer (B) as mentioned above, and further a mold release agent (C) selected from the group consisting of polyethylene waxes and metallic salts of specific aliphatic carboxylic acids.

The polyethylene wax used herein is a polymer of ethylene having an average molecular weight (as measured by viscometry) of usually 500–11000, preferably 1000–3000.

The softening temperature of the polyethylene wax is usually 110°–145° C., preferably 125°–135° C. The polyethylene wax is usually a homopolymer of ethylene, but an α-olefin other than ethylene may be copolymerized to an extent such that the characteristics of the resulting copolymer wax are not deteriorated. In this case, the amount of the α-olefin other than ethylene to be copolymerized is usually 0–45% by weight.

The metallic salt of carboxylic acid (C) used in the invention includes metallic salts of aliphatic carboxylic acids having 26–32 carbon atoms. Specific examples of the metallic salts of aliphatic carboxylic acid having 26–32 carbon atoms include metallic salts of cerotic acid, montanic acid and melissic acid. The metals that form salts with these aliphatic carboxylic acids are those belonging to the group I, II and III of the periodic table. Specific examples of these metallic salts of aliphatic carboxylic acid having 26–32 carbon atoms are calcium montanate, sodium montanate and lithium montanate. Sodium salts are preferred and sodium salts of montanic acid, which is commercially available for example from Hoechst Japan under the trade name Hostamont NAV-101, is particularly preferred.

The polyethylene waxes and metallic salts of aliphatic carboxylic acids having 26–32 carbon atoms mentioned above may be used either singly or in combination.

Because calcium stearate or magnesium stearate which is conventionally used as a mold release agent for an aliphatic polyamide resin, foams the composition comprising the above-mentioned aromatic polyamide (A) and graft-modified copolymer (B) according to the invention at the time of molding, the resulting connector fails to exhibit favorable physical properties.

The resin composition used for the preparation of the connectors of the invention contains the aromatic polyamide (A) in an amount of 65–90% by weight, preferably 70–80% by weight and the graft-modified copolymer (B) in an amount of 10–35% by weight, preferably 20–30% by weight, with the proviso that the sum total of the aromatic polyamide (A) and graft-modified copolymer (B) is 100% by weight; and further the mold release agent (C) in an amount, based on 100% by weight the sum total of the aromatic polyamide (A) and graft-modified copolymer (B), of 0.1–1.0% by weight, preferably 0.1–0.5% by weight.

The polyamide resin compositions used for forming the connectors of the present invention has a specific gravity of usually about 1.05–1.12, preferably about 1.07–1.10. This specific gravity is lower than those of resins widely used for making connectors, such as polybutylene terephthalate having a specific gravity of about 1.31 and nylon 66 having a specific gravity of about 1.14. Accordingly, the use of the above-mentioned polyamide resin compositions makes it possible to save the weight of connectors.

Antioxidant (D)

The resin composition comprising the above-mentioned specific aromatic polyamide (A), graft-modified copolymer (B) and mold release agent (C) used for the preparation of the connectors of the invention may further contain an antioxidant (D). Examples thereof include known antioxidants such as phenol, sulfur and phosphorous antioxidants. Of these antioxidants, particularly preferred are hindered phenol and sulfur antioxidants.

The hindered phenol antioxidant having a molecular weight usually of at least 500, preferably at least 540, especially at least 600, exhibits a high effectiveness. It is preferable that the hindered phenol antioxidant has a temperature, at which a reduction in its weight by 10% in a thermogravimetric analysis curve, as measured in air (TGA 10% weight reduction temperature), corresponds to usually at least 300° C., preferably at least 320° C., especially at least 350° C. The thermogravimetric analysis curve may be obtained by measurement at a heating rate of 10° C./min using a thermal analyzer TG-DTA from Rigaku Denki K.K. The hindered phenol antioxidants having the above-mentioned molecular weight and TGA temperature are difficult to decompose under heat during molding.

Examples of the hindered phenol antioxidants having such characteristics include those as listed below.

n-Octadecyl-3-(4'-hydroxy-3',5'-di-tert-butylphenyl) propionate: (molecular weight 530, TGA 10% weight reduction temperature 305° C.), 1,1,3-Tris(2-methyl-4-hydroxy-5-tert-butylphenyl) butane: (molecular weight 544, TGA 10% weight reduction temperature 323° C.), 1,3,5-Trimethyl-2,4,6-tris (3,5-di-tert-butyl-4-hydroxyphenyl) benzylbenzene: (molecular weight 774, TGA 10% weight reduction temperature 338° C.), 1,3,5-Tris (4-hydroxy-3,5-di-tert-butylbenzyl)-s-triazine-2,4,6-(1H,3H,5H)-trione: (molecular weight 783, TGA 10% weight reduction temperature 347° C.), Ethylene glycol-bis[3,3-bis(3'-tert-butyl-4-hydroxyphenyl)butylate]: (molecular weight 794, TGA 10% weight reduction temperature 344° C.), Tetrakis[methylene-3-(3, 5-di-tert-butyl-4-hydroxyphenyl)propionate]methane: (molecular weight 1176, TGA 10% weight reduction temperature 355° C.), 3,9-Bis[2-{3- (3-tert-butyl-4-hydroxy-5-methylphenyl) propionyloxy}-1,1-dimethylethyl]-2,4,8,10-tetraoxaspiro[5,5]undecane: (molecular weight 741, TGA 10% weight reduction temperature 372° C.), 1,6-Hexanediol-bis[3-(3,5-di-tert-butyl-4-hydroxyphenyl) propionate]: (molecular weight 639, TGA 10% weight reduction temperature 314° C.), Triethylene glycol-bis[3-(3-tert-butyl-5-methyl-4-hydroxyphenyl) propionate]: (molecular weight 587, TGA 10% weight reduction temperature 311° C.), N,N'-hexamethylene-bis(3,5-tert-butyl-4-hydroxycinnamamide): (molecular weight 637, TGA 10% weight reduction temperature 330° C.), N,N'-bis[3-(3,5-di-tert-butyl-4-hydroxyphenyl) propionyl]hydrazine: (molecular weight 553, TGA 10% weight reduction temperature 304° C.), 2,2'-oxamido-bis-ethyl-3-(3,5-di-tert-butyl-4-hydroxyphenyl) propionate: (molecular weight 697, TGA 10% weight reduction temperature 323° C.), 2,2'-methylene-bis (4-methyl-6-tert-butylphenol) terephthalate: (molecular weight 810, TGA 10% weight reduction temperature 327° C.), 1,3,5-Tris[(3,5-di-tert-butyl-4-hydroxyphenyl) propionyloxyethyl) isocyanurate: (molecular weight 1045, TGA 10% weight reduction temperature 346° C.), 2,2'-thio-diethylenebis [3-(3,5-di-tert-butyl-4-hydroxyphenyl propionate], and 2,2'-bis[4-{2-(3,5-di-tert-butyl-4-hydroxyhydrocinnamoyloxy)}ethoxyphenyl]propane: (molecular weight 836).

These compounds may be used either singly or in combination.

Of these hindered phenol antioxidants, preferred are polyhydric, preferably two or more hydric phenols, and particularly preferred are:

3,9-bis[2-{3-(3-tert-butyl-4-hydroxy-5-methylphenyl) propionyloxy}-1,1-dimethylethyl]-2,4,8,10-tetraoxaspiro{5,5}undecane, N,N'-hexamethylenebis (3,5-di-tert-butyl-4-hydroxycinnamamide), 1,1,3-tris(2-methyl-4-hydroxy-5-tert-butylphenyl) butane and n-octadecyl-3-(4'-hydroxy-3',5'-di-tert-butylphenyl) propionate.

It has been found that the sulfur antioxidant having a molecular weight of usually at least 600, preferably at least 620, especially at least 650, exhibits a high effectiveness. The sulfur antioxidant has a temperature, at which a reduction in its weight by 10% in a thermogravimetric analysis curve, as measured in air (TGA 10% weight reduction temperature), corresponds to usually at least 280° C., preferably at least 290° C., especially at least 300° C. The sulfur antioxidants having the above-mentioned molecular weight and TGA temperature are difficult to decompose under heat during molding.

Further, as the sulfur antioxidant, compounds represented by the following formula [III]may be preferably used:

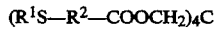

$(R^1S-R^2-COOCH_2)_4C$      [III]

wherein $R^1$ is a hydrocarbon radical having usually 3-20 carbon atoms, preferably 5-20 carbon atoms, $R^2$ is a divalent hydrocarbon radical having usually 1-5 carbon atoms, preferably 1-3 carbon atoms, and the four sulfur-containing groups attached to the carbon atom may be either the same or different.

A specific example of the compounds of the formula [III]is:

Penta (erythrityl-tetra-$\beta$-mercaptolauryl) propionate: (molecular weight 1160, TGA 10% weight reduction temperature 300° C.).

As the sulfur antioxidant, there may also be used compounds represented by the following formula [IV], in addition to the compounds of the formula [III]:

$S(R^4-COOR^3)_2$      [IV]

wherein $R^3$ is an alkyl group having usually 15-30 carbon atoms, preferably 18-30 carbon atoms, which optionally contains a sulfur atom, and $R^4$ is a divalent aromatic group which optionally carries an alkyl group, a divalent alicyclic alkyl group which optionally carries an alkyl group, a divalent alkyl group or a single bond.

Specific examples of the compounds of the formula [IV] include:

Distearylthio-di-1,1'-methylpropionate: (molecular weight 696, TGA 10% weight reduction temperature 296° C.), Myristylstearylthio dipropionate: (molecular weight 626, TGA 10% weight reduction temperature 284° C.), Distearylthio dipropionate: (molecular weight 682, TGA 10% weight reduction temperature 292° C.), and Distearylthio dibutyrate: (molecular weight 710, TGA 10% weight reduction temperature 296° C.).

Of the sulfur antioxidants illustrated above, the compounds of the formula [III]exhibit particularly excellent heat stability in the above-mentioned specific aromatic polyamide.

In the resin composition used according to the invention, either the hindered phenol antioxidant or sulfur antioxidant, or both are incorporated in an amount, based on 100 parts by weight of the resin components, of usually 0.2-4 parts by weight, preferably 0.5-2 parts by weight. It is particularly preferable to use both the hindered phenol and sulfur antioxidants, and the weight ratio of the hindered phenol antioxidant to the sulfur antioxidant is in the range of usually 1:5 to 5:1, preferably 1:3 to 3.5:1.

The thermoplastic resin composition used according to the invention may be incorporated with further additives, such as inorganic fillers, organic fillers, heat stabilizers, weathering stabilizers, antistatic agents, anti-slip agents, anti-blocking agents, anti-fogging agents, lubricants, pigments, dyes, natural oils and synthetic oils, so long as they do not deteriorate the characteristics of the composition.

Further, the composition may be mixed with other heat resisting thermoplastic resins to an extent such that they do not also deteriorate characteristics of the composition. Examples of such heat resisting resins include PPS (polyphenylene sulfide), PPE (polyphenylene ether), PES (polyether sulfone), PEI (polyether imide), LCP (liquid crystal polymer) and modification products of these resins. In the present invention, the use of polyphenylene sulfide is particularly preferred.

The content of the heat resisting thermoplastic resin in the composition is usually less than 50% by weight, preferably 0-40% by weight.

Connector

For the preparation of the connectors of the invention, a resin composition is first prepared by mixing and melting the above-mentioned aromatic polyamide (A), graft modified elastomeric copolymer (B), and mold release agent compound (C), and, optionally, antioxidant (D). In that case, there may be used ordinary kneading devices such as an extruding machine and a kneader. The mold release agent (C) may be added to the resin composition after preparation thereof.

Figure 2:
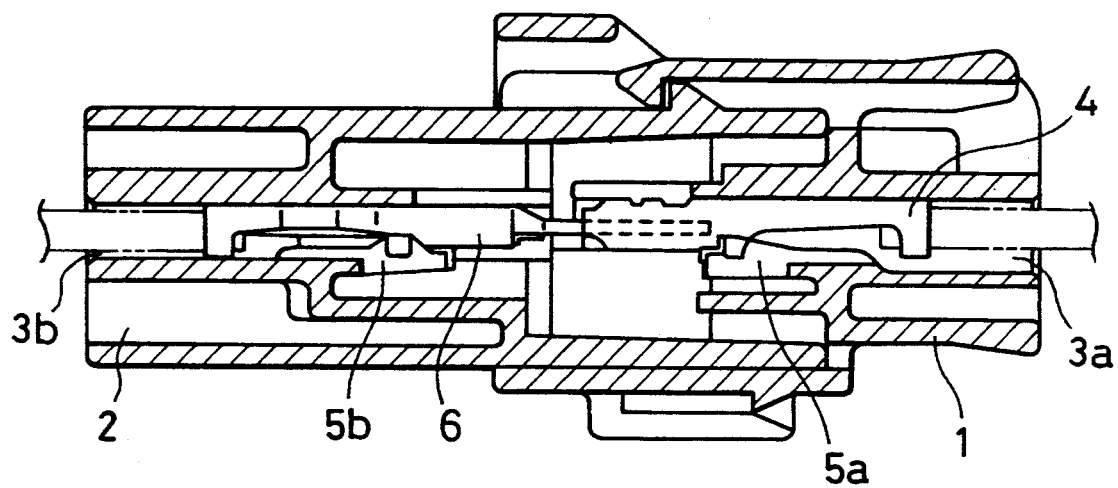
FIG. 2 is a sectional view showing the housings of FIG. 1 which are connected to each other.

With the resin composition thus obtained, a connector main body, for example connector housings which are depicted in FIGS. 1 and 2, may be prepared by means of conventionally used methods such as an injection molding technique.

As shown in FIGS. 1 and 2, the connector of the invention comprises a female connector housing 1 and a male connector housing 2, both being formed from the above-mentioned polyamide resin composition. In the female connector housing 1, there are formed a plurality of terminal inserting chambers 3a, and in each of the terminal inserting chambers 3a, a female terminal 4 is supported by means of a terminal hooking member (lance) 5 formed integrally with the female connector housing. On the other hand, in the male connector housing 2, there are also formed a plurality of terminal inserting chambers 3b, and in each of the terminal inserting chambers 3bof the male terminal connector housing, a male terminal 6 is supported by means of a terminal hooking member (lance) 5b formed integrally with the male connector housing 2 so as to the male terminal 6 is capable of contacting with the female terminal 4 of the female connector housing 1 when the male connector housing 2 is fitted with the female connector housing 1. In the connector of the invention having such a structure, a first half front portion of the male connector housing 2 is fitted to a fitting portion 7 of a first half front portion of the female connector housing 1, whereby the both connector housings are engaged to each other by means of a holding means comprising an elastic holding member 8 and a holding projection 9, and the female terminals 4 and the male terminals 6 are connected electrically with each other.

The connector of the present invention having such a structure as mentioned above not only can be used as a conventional connector, but also is particularly suitable for use under conditions where heating and cooling are repeated as in an automotive engine room, because the connector of the invention has excellent heat resistance and less in drop of toughness caused by heating the connector. For example, when an conventional connector is used in an automotive engine room, toughness thereof is dropped by heating, resulting in decrease in service durability. In contrast, the connector of the invention hardly suffers such a drop in toughness, so that it keeps a necessary extensibility even after heat aging.

The connector of the present invention does not decrease in toughness even after exposure to high temperature for a long period of time.

The resin composition used according to the invention for forming the housings of the connector of the invention has excellent mold release characteristics, so that the resin composition can provide molded housings at a high productivity rate.

In addition, the resin composition used for the connector housings of the invention has a lower specific gravity than those of resins for conventional connectors, so that it can contribute in saving the weight of connector.

Further, the resin composition used for the connector housings of the invention exhibits a low water absorption and excellent chemical resistance, and hence the connector formed from the composition has high dimensional stability even when the connector is brought into contact with water.

EXAMPLES

The present invention is further illustrated with reference to the following examples, but it should be construed that the invention is in no way limited to those examples.

Synthesis Example 1

Aromatic Polyamide (A) was prepared in the manner as described below.

Preparation of Aromatic Polyamide (A)

A 1-liter reactor was charged with 255.6 g (2.2 mol) of 1,6-diaminohexane, 201 g (1.2 mol) of terephthalic acid, 144.7 g (0.99 mol) of adipic acid, 0.45 g ($4.25 \times 10^{-3}$ mol) of sodium hypophosphite as a catalyst, and 148 ml of deionized water, purged with nitrogen and then the reaction was carried out for 1 hour at 250° C. and 35 kg/cm$^2$. The molar ratio of terephthalic acid to adipic acid is 55:45.

After the reaction time of 1 hour, the reaction product was withdrawn from the reactor into a container which was connected to the reactor and kept an internal pressure lower by about 10 kg/cm$^2$ than that of the reactor, to obtain 545 g of a polyamide precursor having an intrinsic viscosity ($\eta$) (as measured at 30° C. in a concentrated sulfuric acid) of 0.15 dl/g.

Subsequently, the polyamide precursor was dried and polymerized by melting in a twin-screw extruder at a cylinder temperature of 30° C. to obtain an aromatic polyamide.

This polyamide, named Aromatic Polyamide A, had the following composition. In the dicarboxylic acid constituent units, the content of the terephthalic acid constituent units is 55% by mol and that of the adipic acid constituent units is 45% by mol. Physical properties of the polyamide were:

Intrinsic viscosity
(at 30° C. in a concentrated sulfuric acid) .. 1.0 dl/g
Melting point ... 313° C. Glass transition temperature. .. 80° C.

Synthesis Example 2

In the manner as described below, two types of modified copolymers [Modified Copolymer (B-a), and Modified Copolymer (B-b)] were obtained.

Preparation of Modified Copolymer (B-a)

An ethylene/propylene copolymer rubber having a molar ratio of ethylene to propylene of 81:19 was prepared by a conventional method. This copolymer had an intrinsic viscosity ($\eta$), as measured at 135° C. in decalin, of 2.19 dl/g.

Maleic anhydride was graft polymerized on this ethylene/propylene copolymer rubber by a conventional method to obtain a maleic anhydride-graft modified ethylene/propylene copolymer rubber. The amount of maleic anhydride grafted was 0.77% by weight.

Preparation of Modified Copolymer (B-b)

Maleic anhydride was graft polymerized on a hydrogenated styrene/butadiene/styrene block copolymer (styrene content: 30% by weight; Trade name: Krayton G available from Shell Chemical Co.) to obtain a maleic anhydride-graft modified and hydrogenated styrene/butadiene/styrene block copolymer. The amount of maleic anhydride grafted was 1.94% by weight.

Example 1

80 parts by weight of Aromatic Polyamide (A) obtained in Synthesis Example 1, 20 parts by weight of Modified Copolymer (B-a) obtained in Synthesis Example 2, 0.25 part by weight of sodium montanate (Trade name: Hostamont NAV 101 available from Hoechst Japan), 0.5 part by weight of a phenol antioxidant (Trade name: Sumirizer GA-80 available from Sumitomo Chemical Co.) and 0.5 part by weight of a sulfur antioxidant (Trade name: Synox 412S available from Sypro Kasei K.K.) were mixed, and then pelletized using a twin-screw extruder (PCM45 manufactured and sold by Ikegai Tekko K.K.) at a cylinder temperature set to 320° C.

The thus obtained pellets of the polyamide resin composition were injection molded to obtain test specimens and connectors having required sizes and shapes.
Injection molding conditions:
Injection molding machine: IS55EPN manufactured by Toshiba Kikai K.K.
Cylinder temperature: 320° C.
Mold temperature: 50° C.

Figure 3:
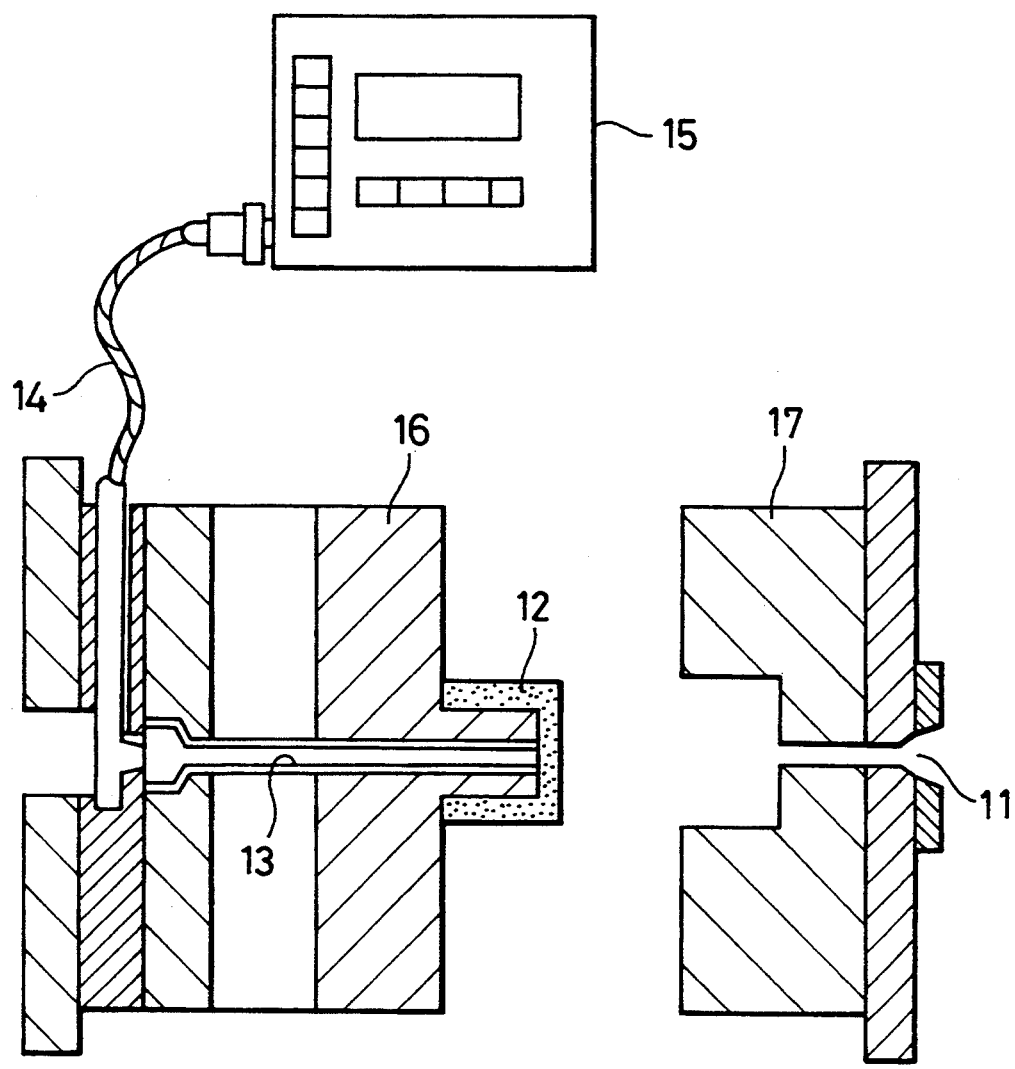
FIG. 3 is a schematic view showing the structure of a device used for measuring a mold release force.

Injection pressure: 900 kg/cm²
Method for evaluation:
(1) Specific gravity:
  Measured according to ASTM D792.
(2) Water absorption:
  Measured according to ASTM D570. A test specimen of 3.2×12.7×127 mm was immersed in water at 23° C. for 24 hours and then the water absorption was determined.
(3) Izod impact strength:
  Measured according to ASTM D256 (notched).
(4) Tensile strength and tensile elongation:
  Measured according to ASTM D638 on an ASTM test specimen No. 4 of 2 mm thick at a stress rate of 5 mm/min.
(5) Heat resistance:
  The tensile elongation was measured under the same conditions as above, except that the ASTM test specimen which had been allowed to stand in an air oven kept at 150° C. for 500 hours was used. The smaller is the drop in tensile elongation, the better is the heat resistance.
(6) Mold release characteristics:
  A closed-end cylindrical specimen was molded using a mold equipped with a device for measuring a mold release force as shown in FIG. 3, and a force required to release the molded specimen from the mold was measured.
  That is, as shown in FIG. 3, a resin composition is filled into a room formed between a male mold 16 and a female mold 17 adapted for forming a cup-like molded article through a spool runner 11 to prepare a cup-like molded article 12. After cooling, the molds 16 and 17 are released, and the cup-like molded article 12 is pushed out by means of a pushing pin 13 provided at the center of the male mold 16. A pressure applied to the pushing pin 13 for taking the molded article out of the molds is measured by means of a pressure sensor 14, and the measured value is recorded by means of a mold release force recorder 15.
  The molds are designed to form a closed cylindrical test specimen of 20 mm in diameter, 20 mm in depth and 1 mm in wall thickness.

Example 2

Example 1 was repeated except that Modified Copolymer (B-b) was used in place of Modified Copolymer (B-a).

Example 3

Example 1 was repeated except that a polyethylene wax (Trade name: Highwax 200 P available from Mitsui Petrochemical, Ltd.) was used in place of the sodium montanate as the mold release agent (C).

Comparative Example 1

Example 1 was repeated except that the use of mold release agent (C) was omitted.

Comparative Example 2

Example 1 was repeated except that calcium stearate was used in place of sodium montanate.

Comparative Example 3

Example 1 was repeated except that nylon 66 (Trade name: 2020UW1 available from Ube Industries, Ltd.) was used in place of the aromatic polyamide resin composition.

Comparative Example 4

Example 1 was repeated except that polybutylene terephthalate (PBT, Trade name: BT1000S-01 available from Dainippon Ink K.K.) was used in place of the aromatic polyamide resin composition.

The compositions and evaluation results of the above Examples and Comparative Examples are shown in Tables 1 and 2.

TABLE 1

|  | Ex. 1 | Ex. 2 | Ex. 3 | Comp. Ex. 1 | Comp. Ex. 2 | Comp. Ex. 3 | Comp. Ex. 4 |
| --- | --- | --- | --- | --- | --- | --- | --- |
| Aromatic Polyamide (A) | 80 | 80 | 80 | 80 | 80 | NY66 only | PBT only |
| Modified Copolymer (B-a) | 20 | — | 20 | 20 | 20 | | |
| Modified Copolymer (B-b) | — | 20 | — | — | — | | |
| Mold release agent C (NAV 101) | 0.5 | 0.5 | — | — | — | | |
| Mold release agent C (200P) | — | — | 0.5 | — | — | | |
| Mold release agent C (Ca stearate) | — | — | — | — | 0.5 | | |
| NY 66 | — | — | — | — | — | 100 | — |
| PBT | — | — | — | — | — | — | 100 |
| Specific gravity (—) | 1.10 | 1.10 | 1.10 | 1.10 | 1.10 | 1.14 | 1.31 |
| Water absorption (%) | 0.3 | 0.3 | 0.3 | 0.3 | 0.3 | 1.2 | 0.02 |
| Izod impact strength (kg.cm/cm) | 70 | 70 | 70 | 80 | 10 | 7 | 5 |
| Tensile strength (kg/cm²) | 650 | 650 | 650 | 650 | 550 | 800 | 550 |
| Tensile | 50 | 60 | 50 | 50 | 15 | 80 | 130 |

TABLE 1-continued

| | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|
| elongation (%) | | | | | | | |
| Heat resistance (tensile elongation after 50 h at 150° C.) (%) | 20 | 20 | 20 | 20 | 5 | 25 | 8 |
| Injection moldability (—) | good | good | good | good | foamed | good | good |
| Mold release force (kg/cm$^2$) | 4 | 5 | 5 | >17 cannot be taken out | 5 | 3 | 3 |

TABLE 2

| | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|
| Weight of connector (g) | 8.92 | 8.93 | 8.92 | — | 8.92 | 9.51 (before moisture conditioning) | 10.47 |
| Initial stage | | | | | | | |
| Lock releasability | good | good | good | — | good | good | good |
| Connector fitting force (Kgf) | 14.8 | 14.6 | 14.9 | — | 14.2 | 11.0 | 17.1 |
| Terminal holding force (female housing) (Kgf) | 13.8 | 13.5 | 13.2 | — | 13.6 | 9.1 | 11.8 |
| Heat resistance (after 200 hr at 180° C.) | | | | | | | |
| Lock releasability | good | good | good | — | good | good | not good |
| Connector fitting force (Kgf) | 14.7 | 14.2 | 14.6 | — | 14.0 | 10.9 | unmeasurable |
| Terminal holding force (female housing) (Kgf) | 13.7 | 13.7 | 13.5 | — | 13.3 | 8.9 | unmeasurable |
| Injection moldability | good | good | good | good | foamed | good | good |
| Mold release properties | good | good | good | unable *1 | good | good | good |

*1: Evolution could not be made because the molded article could not be taken out of the molds.

What is claimed is:

1. A connector having a housing which is formed from a polyamide resin composition comprising
    (A) 65–90% by weight of an aromatic polyamide having an intrinsic viscosity ($\eta$), as measured in a concentrated sulfuric acid at 30° C., of 0.5–3.0 dl/g and a melting point of exceeding 300° C.,
    said aromatic polyamide (A) being composed of recurring units comprising 50–100% by mol of terephthalic acid constituent units, 0–50% by mol of aromatic dicarboxylic acid constituent units other than the terephthalic acid constituent units and/or 0–50% by mol of aliphatic dicarboxylic acid constituent units, each of which has 4 to 20 carbon atoms, and
    recurring units comprising aliphatic alkylenediamine constituent units and/or alicyclic alkylenediamine constituent units; and
    (B) 10–35% by weight of a graft-modified α-olefin random copolymer and/or a graft-modified vinyl aromatic hydrocarbon/conjugated diene copolymer or a hydrogenation product thereof, with the proviso that the sum total of aromatic polyamide (A) and graft-modified copolymer (B) is 100% by weight; and
    (C) 0.1–1.0% by weight, based on 100% by weight of the sum total of aromatic polyamide (A) and graft-modified copolymer (B), of at least one compound selected from the group consisting polyethylene waxes and metallic salts of aliphatic carboxylic acids having 26 to 32 carbon atoms.

2. A connector having a housing which is formed from a polyamide resin composition comprising
    (A) 65–90% by weight of an aromatic polyamide having an intrinsic viscosity ($\eta$), as measured in a concentrated sulfuric acid at 30° C., of 0.5–3.0 dl/g and a melting point of exceeding 300° C.,
    said aromatic polyamide (A) being composed of recurring units comprising 50–100% by mol of terephthalic acid constituent units, 0–50% by mol of aromatic dicarboxylic acid constituent units other than the terephthalic acid constituent units and/or 0–50% by mol of aliphatic dicarboxylic acid constituent units, each of which has 4 to 20 carbon atoms, and
    recurring units comprising aliphatic alkylenediamine constituent units and/or alicyclic alkylenediamine constituent units; and
    (B) 10–35% by weight of a graft-modified α-olefin random copolymer and/or a graft-modified vinyl aromatic hydrocarbon/conjugated diene copolymer or a hydrogenation product thereof, with the proviso that the sum total of aromatic polyamide (A) and graft-modified copolymer (B) is 100% by weight; and (C) 0.1–1.0% by weight, based on 100% by weight of the sum total of aromatic polyamide (A) and graft-modified copolymer (B), of at least one compound selected from the group consisting polyethylene waxes and metallic salts of aliphatic carboxylic acids having 26 to 32 carbon atoms; and (D) an antioxidant including a hindered phenol antioxidant and a sulfur antioxidant.

3. The connector as claimed in claim 1 or 2 wherein the dicarboxylic acid constituent units of said aromatic polyamide (A) is composed of 50–80% by mol of terephthalic acid constituent units, 0–40% by mol of aromatic dicarboxylic acid constituent units other than terephthalic acid, and 20–50% by mol of aliphatic dicarboxylic acid constituent units.

4. The connector as claimed in claim 1 or 2 wherein the graft-modified α-olefin random copolymer and/or graft-modified vinyl aromatic hydrocarbon/conjugated diene copolymer or hydrogenation product thereof (B) is a graft-modified ethylene/propylene copolymer and/or a hydrogenation product of a graft-modified styrene/butadiene/styrene block copolymer.

5. The connector as claimed in claim 1 or 2 wherein component (C) is sodium montanate.

6. The connector as claimed in claim 2 wherein the antioxidant (D) comprises a hindered phenol antioxidant having a molecular weight of at least 500 and a sulfur antioxidant having a molecular weight of at least 600.

7. The connector as claimed in claim 6 wherein the hindered phenol antioxidant and sulfur antioxidant are present at a weight ratio in the range of from about 1:5 to 5:1.

* * * * *